W. P. Elliott,
Sewing Machine Caster.
No. 101,843.         Patented Apr. 12. 1870.
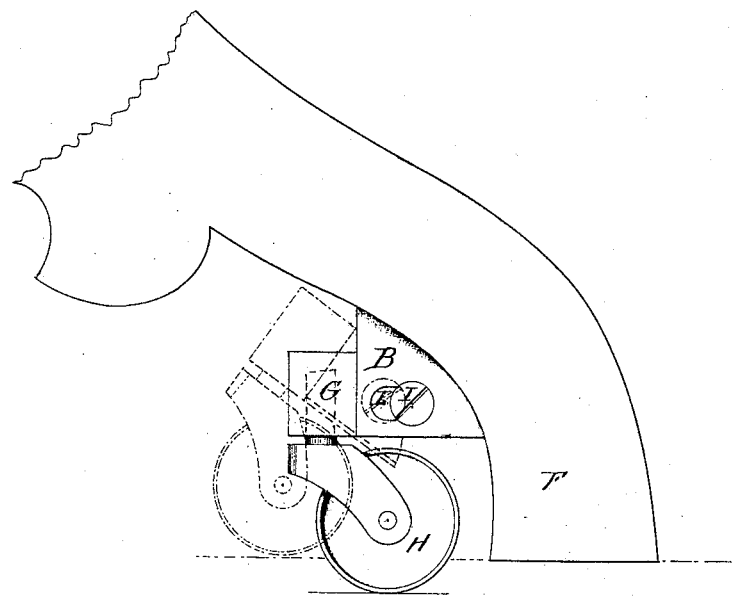
Witnesses.
J. H. Shumway
A. J. Tibbits
W. P. Elliott
Assignor to Self & L. P. Goodyear
Inventor
By Atty
John E. Earle

UNITED STATES PATENT OFFICE.

WILLIAM P. ELLIOTT, OF NEW HAVEN, CONNECTICUT, ASSIGNOR TO HIMSELF AND LEVERETT F. GOODYEAR, OF SAME PLACE.

IMPROVEMENT IN CASTERS FOR SEWING-MACHINES.

Specification forming part of Letters Patent No. 101,843, dated April 12, 1870.

*To all whom it may concern:*

Be it known that I, WM. P. ELLIOTT, of New Haven, in the county of New Haven and State of Connecticut, have invented a new Improvement in Adjustable Casters for Sewing-Machines; and I do hereby declare the following, when taken in connection with the accompanying drawing and the letters of reference marked thereon, to be a full, clear, and exact description of the same, and which said drawing constitutes part of this specification, and represents a side view of the caster attached to a portion of the machine-leg.

This invention relates to an improvement in the adjustment of casters for sewing-machines, so that the machine may be easily moved about, or the casters set so that the machine will stand solidly upon its legs; and the invention consists in hinging the caster-wheel to the leg of the machine by means of a slot and set-screw, so that it may be thrown up and set so as to allow the leg itself to rest directly upon the floor, or turned down and set so as to take the weight of the machine.

F is the leg or foot of a sewing-machine, on which is formed a projection, B. G is a block secured to the projection B by a screw, I, through a slot, L, in the said projection. To the block G the caster-wheel H is pivoted, so as to swing to the right or left.

When it is desired to raise the machine so as to rest entirely upon the caster-wheel the block G is set and held by the set-screw in the position denoted in the drawing; but when not required for use loose the screw I and raise the block and caster into the position denoted in broken lines, which draws the screw forward in the slot, and there it may be set and hold the caster in that position.

This construction is a great convenience in the transportation of the machine, as it positively takes the machine from the caster.

I do not wish to be understood as broadly claiming the arrangement of a caster so as to be adjusted to entirely support the machine or to allow the machine to rest solidly on the legs, as the case may be.

I claim as my invention—

The block G, with its caster H, secured to the leg of a sewing-machine by means of a slot, L, and set screw I, and so as to be adjusted substantially as described.

WILLIAM P. ELLIOTT.

Witnesses:
JOHN H. SHUMWAY,
A. J. TIBBITS.